United States Patent
Oriet

(10) Patent No.: US 9,242,543 B2
(45) Date of Patent: Jan. 26, 2016

(54) SERIES HYBRID GENERATOR

(71) Applicant: Leo P. Oriet, Rochester Hills, MI (US)

(72) Inventor: Leo P. Oriet, Rochester Hills, MI (US)

( * ) Notice: Subject to any disclaimer, the term of this patent is extended or adjusted under 35 U.S.C. 154(b) by 164 days.

(21) Appl. No.: 13/936,248

(22) Filed: Jul. 8, 2013

(65) Prior Publication Data
US 2015/0008055 A1 Jan. 8, 2015

(51) Int. Cl.
| | | |
|---|---|---|
| *B60K 5/08* | (2006.01) | |
| *B60K 6/26* | (2007.10) | |
| *B60K 6/46* | (2007.10) | |
| *B60K 6/40* | (2007.10) | |
| *H02K 7/18* | (2006.01) | |
| *B60K 6/24* | (2007.10) | |

(52) U.S. Cl.
CPC ... *B60K 6/26* (2013.01); *B60K 5/08* (2013.01); *B60K 6/24* (2013.01); *B60K 6/40* (2013.01); *B60K 6/46* (2013.01); *H02K 7/1815* (2013.01); *Y10S 903/906* (2013.01)

(58) Field of Classification Search
CPC ...... B60K 6/22–6/26; B60K 6/40; B60K 5/08
See application file for complete search history.

(56) References Cited

U.S. PATENT DOCUMENTS

| | | | | | |
|---|---|---|---|---|---|
| 6,306,056 | B1 * | 10/2001 | Moore | ............... | B60K 5/08 180/65.1 |
| 2005/0155170 | A1 * | 7/2005 | Charky | ............... | B60K 5/08 15/78 |
| 2009/0150043 | A1 * | 6/2009 | Eriksson | ............. | F02D 25/02 701/102 |
| 2009/0321158 | A1 * | 12/2009 | Glonner | ............. | B60K 5/08 180/65.23 |
| 2010/0056327 | A1 * | 3/2010 | Hofbauer | ............. | B60K 6/40 477/5 |
| 2010/0289327 | A1 * | 11/2010 | Mackin | ............... | A01D 69/025 307/9.1 |
| 2011/0080040 | A1 * | 4/2011 | Kumar | ............... | B60L 11/123 307/9.1 |
| 2012/0058858 | A1 * | 3/2012 | Ichikawa | ............. | B60K 6/442 477/5 |
| 2012/0285291 | A1 * | 11/2012 | Shi | .................. | B60K 6/105 74/665 A |
| 2013/0081889 | A1 * | 4/2013 | Jo | ..................... | F02B 73/00 180/69.6 |
| 2013/0087426 | A1 * | 4/2013 | Gage | .................. | B60K 25/02 192/112 |
| 2013/0090208 | A1 * | 4/2013 | Ichikawa | ............. | B60K 6/383 477/6 |
| 2013/0102437 | A1 * | 4/2013 | Ichikawa | ............. | B60K 6/44 477/5 |
| 2013/0116087 | A1 * | 5/2013 | Ichikawa | ............. | B60K 5/08 477/79 |

* cited by examiner

*Primary Examiner* — Jeffrey J Restifo
*Assistant Examiner* — Erez Gurari
(74) *Attorney, Agent, or Firm* — George L. Boller

(57) ABSTRACT

An electric generator has an outer rotor supported on a housing for rotation about an axis and a shaft input end lying on the axis at a first end of the housing. An inner rotor is supported on the housing for rotation about the axis and has a shaft input end lying on the axis at a second end of the housing. The outer rotor has an outer rotor generator winding. The inner rotor has an inner rotor generator winding. An outer rotor one-way clutch allows the outer rotor to be rotated by its shaft input end only in one direction. An inner rotor one-way clutch allows the inner rotor to be rotated by its shaft input end only in a direction which is opposite the direction of the outer rotor allowed by the outer rotor one-way clutch. Respective internal combustion engines operate the respective rotors.

8 Claims, 9 Drawing Sheets

SERIES HYBRID GENERATOR

FIELD OF THE INVENTION

This invention relates to a series hybrid generator, one use for which is in a dual-engine, variable-power drive.

SPONSORSHIP

This invention has been sponsored by the National Research Council Canada but is solely owned by the inventor.

BACKGROUND OF THE INVENTION

Achieving future fuel efficiency improvements in medium and heavy duty commercial trucks and buses will be a challenging task for commercial truck and diesel engine manufacturers. Over the past several decades, fuel efficiency improvements have been realized largely through the application of computer technology to the design and development of engines and powertrains and through the adoption of sophisticated engine control systems in commercial trucks. Hybrid powertrains have contributed to fuel economy improvements, but at significantly increased manufacturing costs that raise prices that purchasers must pay. The inventor believes that further improvements in conventional single-engine/powertrain design and development and in engine control systems are unlikely to yield more than minimal fuel economy improvements.

Currently manufactured long haul commercial trucks commonly use large diesel engines in the range of 400-600 maximum horsepower as their prime movers. An engine having such a maximum power output is necessary to accommodate the peak power requirement for typical vocation drive cycles of those vehicles.

The current cost of hybrid powertrains does not justify their wide-spread adoption by the commercial trucking industry. Current sales of hybrid truck, buses, and coaches are predominantly in fulfillment of governmental contracts which use taxpayer funds as a subsidy for the additional costs of such "green" technologies in purchased vehicles.

Current large displacement fixed horsepower diesel engines operate within sub-optimal efficiencies, commonly within ranges between 800 and 2200 revolutions per minute (RPM). Because they accommodate changes in torque and power demand by varying engine RPM, such engines are inherently incapable of achieving optimum performance and best fuel economy.

Failure of a current diesel engine while a vehicle is on the road may create a hazardous condition for the driver and surrounding traffic and/or disable the vehicle to such an extent that unexpected delay, economic losses, and/or customer dissatisfaction become inevitable results of the failure.

Virtually all commercial trucks, buses and coaches on the roads today use conventional brake pads exclusively to decelerate the vehicle, converting the kinetic energy into wasteful heat. While such waste can be partially mitigated by a hybrid powertrain, hybrid powertrains are, as mentioned earlier, not currently cost-justifiable. A hybrid powertrain also inherently adds weight to a vehicle, a fact that adversely impacts fuel economy.

The inventor's U.S. Patent Publication No. 2012 0152631 discloses a drive which when used to propel a vehicle, especially a large commercial vehicle such as a truck or bus for example, selectively uses one or both of two internal combustion engines, especially turbocharged diesel engines, depending on torque and power demands being imposed on the vehicle as it is being driven. The inventor's analysis of that drive shows that this selective use of the engines can enable a vehicle to achieve significant fuel economy improvements in comparison to improvement which is likely to be obtained in engines and engine controls through use of conventional single-engine/powertrain design and development techniques which were mentioned earlier.

The inventor's analysis shows that a single one of two V8 engines can provide sufficient power and torque for approximately 80% of a typical long haul drive cycle. During portions of a drive cycle where demand is greater, such as climbing a grade or accelerating the vehicle, a controller automatically starts a second V8 engine to provide the additional power required. Once the drive cycle returns to lesser demand, the controller automatically turns off one of the engines. In this way the invented drive is capable of maximizing efficiency through optimized variable power delivery.

Each of the two engines is more compact than a single large engine which is capable of delivering maximum power comparable to that of the drive disclosed in when both of its engines are operating the invented drive at maximum power.

Failure of one of the two engines while the vehicle is on the road is unlikely to disable the vehicle because the other engine can be used in most driving situations to drive the vehicle directly to a service facility or to a suitable off-road location.

The drive disclosed in U.S. Patent Publication No. 2012 0152631 can recover substantial brake energy by charging an on-board energy storage system, examples of which are electric energy storage in a battery, battery bank, or ultra-capacitor and hydraulic energy storage in an accumulator. Refuse collection and package delivery vocations present perhaps the largest market opportunity for energy recapture due to low average speeds with frequent stop and start driving. Line haul vocations offer less opportunity for brake energy recapture due to continuous, high speed, non-start-and-stop drive cycles.

An example of the dual-engine, variable-power drive disclosed in U.S. Patent Publication No. 2012 0152631 comprises two generic V8 diesel engines having opposite flywheel rotation which can operate concurrently to deliver power through one or more drive axles to driven wheels that propel a wheeled vehicle such as a commercial truck. When both engines are running at the same power output level, engine torque reaction is cancelled through the respective engine mountings. The SAE (Society of Automotive Engineers) standard diesel engine has counter-clockwise flywheel rotation. The inventor is unaware of any electric generator, other than one embodiment disclosed in his U.S. Patent Publication No. 2012 0152631, which can accommodate counter-clockwise mechanical rotation energy of two standard diesel engines. In that embodiment the engines do not rotate about a common axis.

Although the inventor's publication discloses another embodiment which also uses two diesel engines, one at each end, rotating about a common axis, such a configuration requires one engine to rotate in the clockwise direction and the other in the counterclockwise direction. Clockwise rotation diesel engines are not commonly manufactured. Although such an engine could be manufactured, it would be a special order low volume product that would significantly increase the total cost of manufacturing and maintenance for the two-engine, single-generator configuration.

SUMMARY OF THE INVENTION

The present disclosure introduces a generator which accommodates two standard counter-clockwise rotation, mass-produced, off-the-shelf diesel engines so as to enable their flywheels to rotate about a common axis. A more costly, non-standard engine is not needed; neither is a power-inversion gear box for one of the two engines.

The generator includes one-way mechanical clutches which function to prevent energy losses from a running one of the two engines to the other engine when the latter engine is not running. The generator is always coupled to the engines through torque convertors.

The generator absorbs and cancels out all of the engine torque through the generator housing when both engines are running, thereby eliminating right front wheel overloading resulting from the engine torque transfer to a truck vehicle frame when the engine is mounted at the front of the vehicle with its axis running lengthwise of the vehicle.

The generator is scalable in diameter and length in multiple ways to accommodate various vehicle frame architectures and power generation level requirements; and it allows the vehicle to be propelled should one engine break down.

The foregoing summary, accompanied by further detail of the disclosure, will be presented in the Detailed Description below with reference to the following drawings that are part of this disclosure.

DETAILED DESCRIPTION

Figure 1:
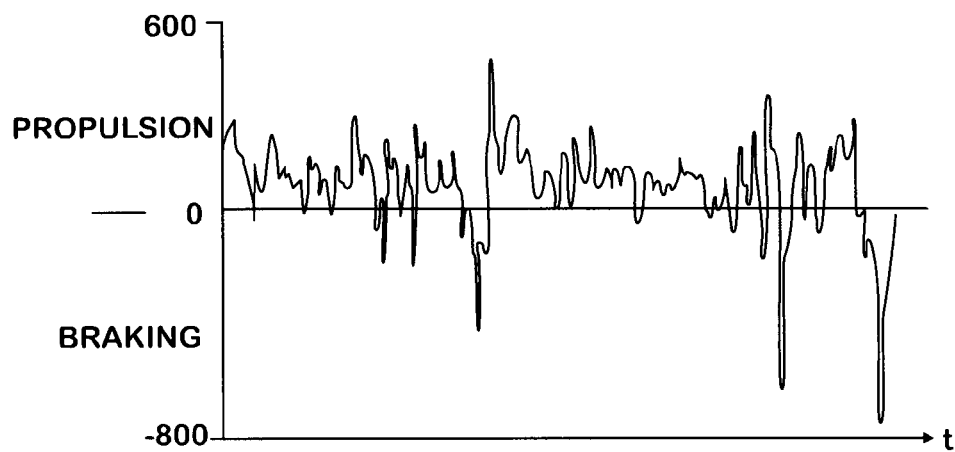
FIGS. 1 and 2 are truck drive cycle power diagrams showing power requirement as a function of drive time during each of two different specified drive cycles.

FIG. 1 is a representative truck drive cycle power diagram (HWFET) showing engine power requirement as a function of drive time during a specified drive cycle. It shows a peak power requirement near 600 horsepower (hp.). The average power requirement is much lower.

Figure 2:
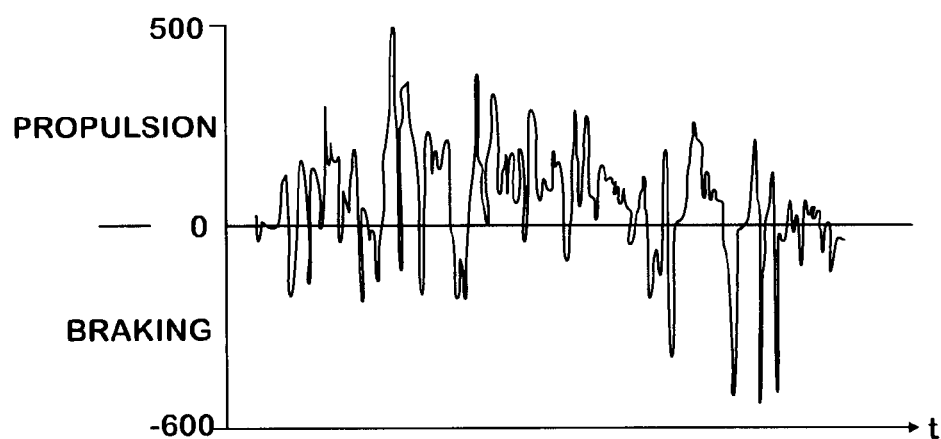

FIG. 2 is a representative truck drive cycle power diagram (WVU Interstate) showing engine power requirement as a function of drive time during a specified drive cycle. It shows a peak power requirement near 500 horsepower (hp.). The average power requirement is much lower.

Figure 3:
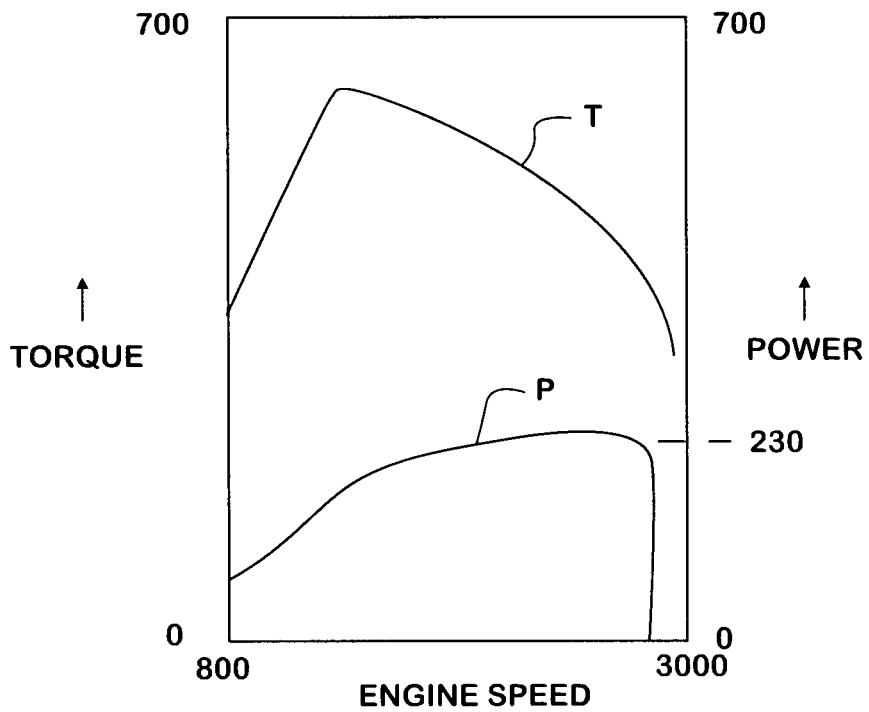
FIGS. 3 and 4 are engine torque/speed, torque/power diagrams for respective currently manufactured turbocharged diesel engines rated at about 131 hp and 475 hp respectively.
Figure 4:
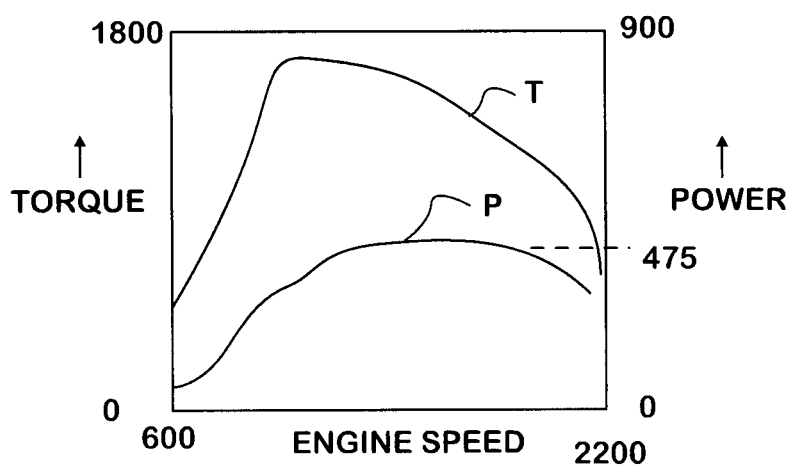
Figure 5:
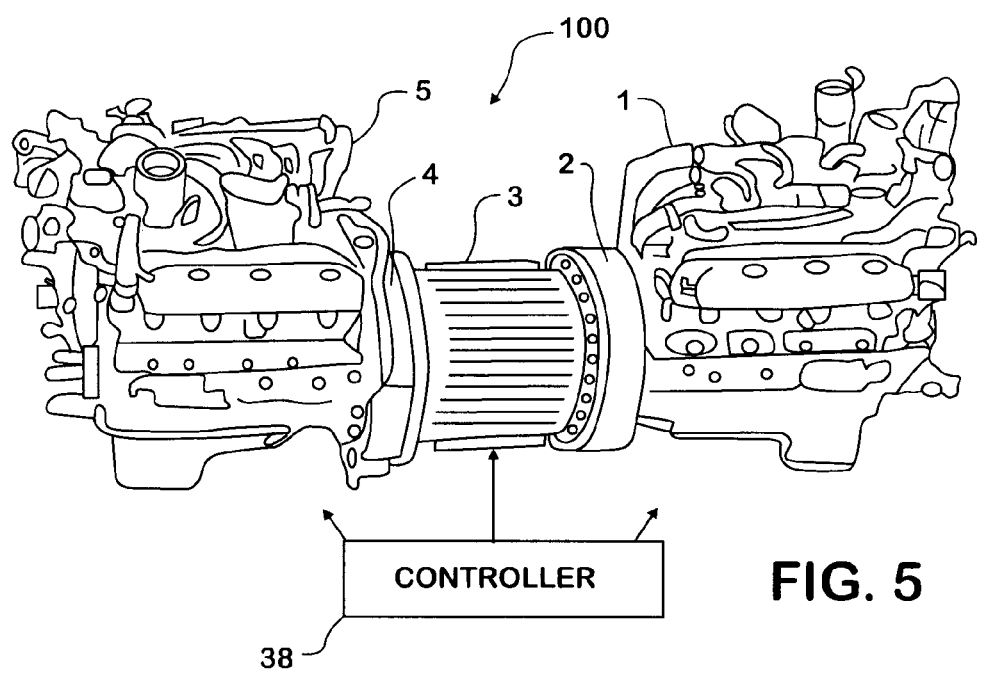
FIG. 5 is perspective view of an embodiment of a dual-engine, variable-power drive.

FIGS. 3 and 4 are engine torque/speed, torque/power diagrams for respective turbocharged diesel engines rated at about 131 hp and 475 hp respectively. The trace T in each diagram represents torque, and the trace P, power.

FIGS. 1-4 are presented to show how a vehicle's fuel economy can be substantially improved by a power unit embodying a dual-engine, variable-power drive having the series hybrid generator disclosed herein.

Figure 6:
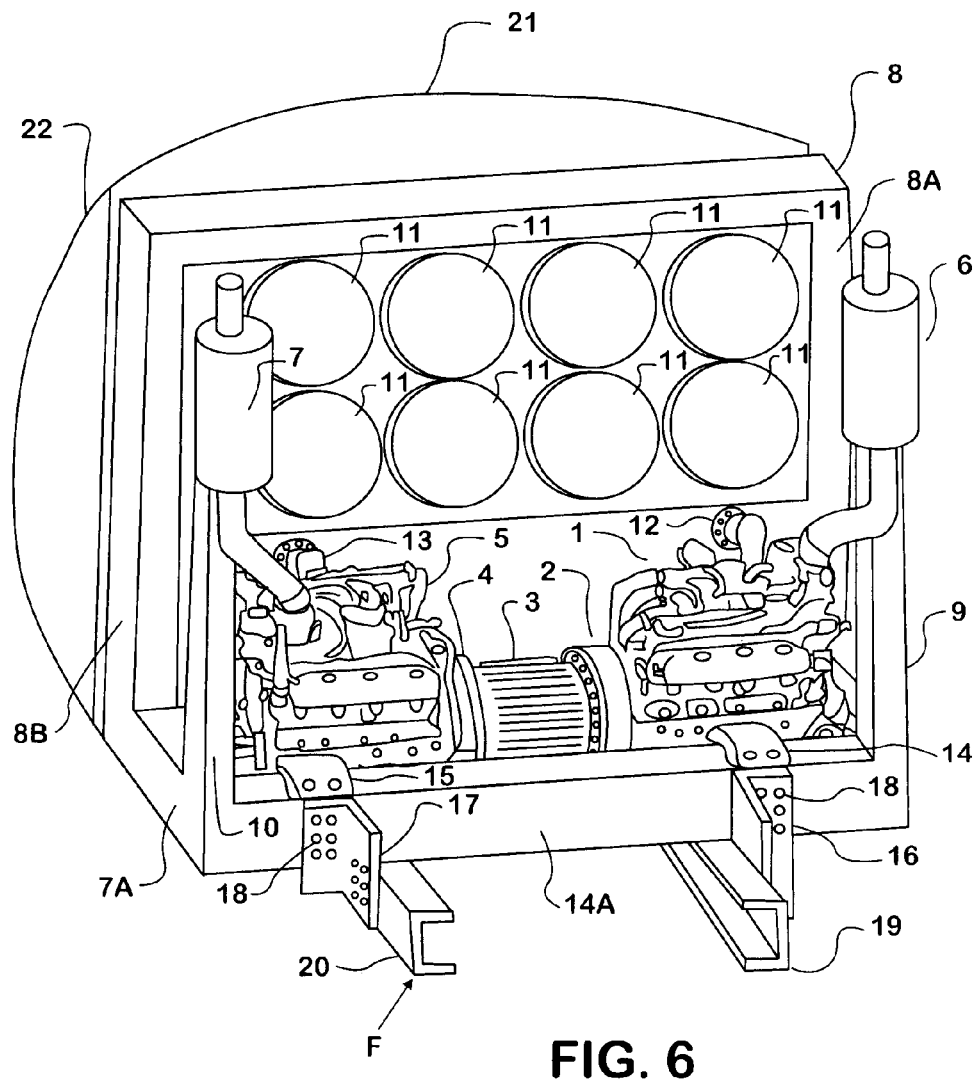
FIG. 6 is perspective view of the dual-engine, variable-power drive of FIG. 5 mounted on a chassis of a truck vehicle having a rear axle drive.
Figure 7:
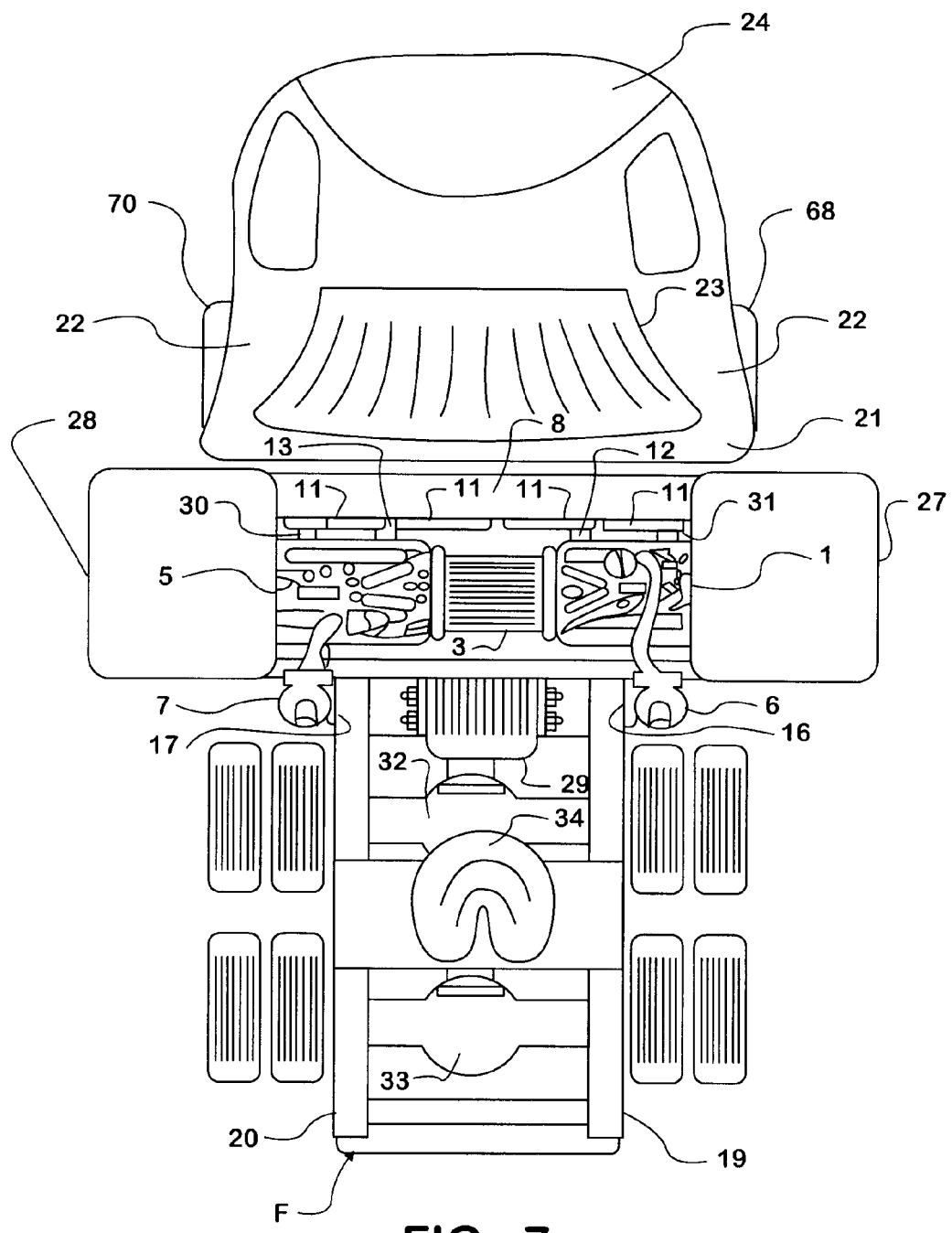
FIG. 7 is a top plan view of the truck vehicle of FIG. 6 showing the dual-engine, variable-power drive.
Figure 8:
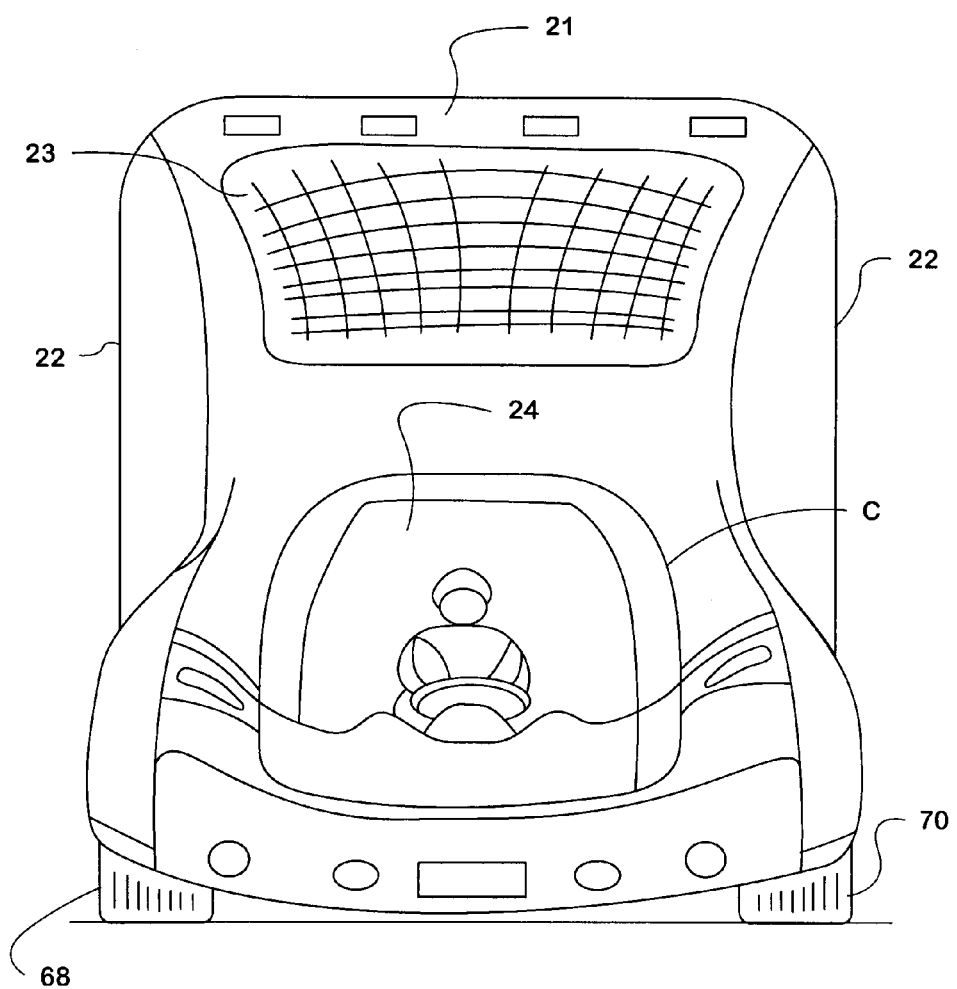
FIG. 8 is a front elevation view of the truck vehicle of FIG. 7.

FIGS. 5-8 show an embodiment of dual-engine, variable-power drive 100 which, when used to propel a truck vehicle and referenced to locations in a chassis frame F of such a vehicle as in FIGS. 6 and 7, comprises: a starboard side turbodiesel propulsion engine 1; a starboard side torque converter 2; a series hybrid generator 3; a port side torque converter 4; a port side turbodiesel propulsion engine 5; a starboard side engine exhaust stack 6, including a diesel particulate filter (DPF) and optional exhaust treatment apparatus; and a port side engine exhaust stack 7, including a diesel particulate filter (DPF) and optional exhaust treatment apparatus.

Those seven components 1 through 7 form an assembly (shown by itself in FIG. 5) which is supported on an engine and cooling module support frame 7A shown in FIG. 6.

A torque converter is a type of fluid coupling which allows an engine to spin somewhat independently of the series hybrid generator at times such as when a vehicle is stopped with the engine idling and the service brakes applied. When the engine is accelerated to accelerate the vehicle, the torque converter delivers engine torque to accelerate the vehicle.

Support frame 7A comprises a starboard side upright 8A and a port side upright 8B for supporting a cooling module 8 which comprises a radiator located forwardly along the chassis frame in relation to components 1 through 5. Support frame 7A also comprises a starboard side upright 9 for supporting starboard side exhaust stack 6 and a port side upright 10 for supporting port side exhaust stack 7. Cooling module 8 comprises multiple electric-driven fans 11 directly rearward of its radiator. When operated, fans 11 draw air through the radiator to cool liquid coolant passing through the radiator.

A starboard side supply coolant conduit 12 supplies liquid coolant to the radiator after having been circulated through coolant passageways in engine 1. A starboard side return coolant conduit which supplies liquid which has been cooled by passage through the radiator back to engine 1 is present but cannot be seen. A port side supply coolant conduit 13 supplies liquid coolant to the radiator after having been circulated through coolant passageways in engine 5. A port side return coolant conduit which supplies liquid which has been cooled by passage through the radiator back to engine 5 is present but cannot be seen.

Engine mounts 14 (only one of which is seen in FIG. 6) support engine 1 at opposite sides of its engine block (front and rear sides as referenced to chassis frame F) on horizontal members 14A (only one of which can be seen in FIG. 6) of support frame 7A. Engine mounts 15 (only one of which can be seen in FIG. 6) support engine 5 at opposite sides of its engine block on members 14A. What would be commonly understood as the front of starboard engine 1 and the front of port engine 5 face in opposite directions at the far ends of drive 100. Each engine has counter-clockwise (CCW) rotation as viewed from its front.

Members 14A are disposed atop chassis frame F at right angles to the length of chassis frame F and are fastened to right (starboard side) and left (port side) side rails 19 and 20 of chassis frame F by starboard side mounts 16 and port side mounts 17 respectively using fasteners 18.

The truck vehicle which is propelled by drive 100 comprises a cab C (FIGS. 7 and 8) having an interior compartment for a driver of the vehicle. A wind deflector present on the exterior of cab C comprises an upper wind deflector 21 which is smoothly contoured upwardly and rearwardly along the length of the cab when looking rearward from the front of the vehicle as in FIG. 8. Starboard side and port side wind deflectors 22 of the wind deflector join with upper wind deflector 21 and are smoothly contoured laterally outwardly and rearwardly. Upper wind deflector 21 comprises an air intake grille 23 directly in front of cooling module 8 to allow air to be drawn through the radiator of the cooling module, by ram air effect and/or use of fans 11. Cab C comprises a front windshield 24 through which the driver has a frontal view from the cab interior.

A cover comprising movable starboard and port side clamshell halves 27, 28 covers support frame 7A and the components which it supports when the clamshell is closed while exhaust stacks 6, 7 are shaped to place their tailpipes outside the cover when the cover is closed. FIG. 7 shows the clamshell halves swung open to provide service access.

The truck vehicle also has a rotary electric machine 29 for operating a tandem rear axle which comprises a front tandem drive axle 32 and a rear tandem drive axle 33. Rotary electric machine 29 has a shaft which is coupled to a differential mechanism of front drive axle 32, and through that differential mechanism, to a differential mechanism of rear drive axle 33.

FIG. 7 shows a port side charge air cooler line 30 running to the radiator of cooling module 8 from a charge air cooler that cools boost air created by the engine turbocharger before entering engine 5 and a starboard side charge air cooler line 31 running to the radiator from a charge air cooler that cools boost air created by the turbocharger before entering engine 1. The return lines from the radiator to the respective charge air coolers which complete the respective coolant loops cannot be seen in FIG. 7.

Right and left front steerable wheels 68, 70 respectively are suspended from chassis frame F on right and left sides for steering the truck. Front and rear tandem drive axles 32, 33 are suspended from chassis frame F rearward of front steerable wheels 68, 70. Axle 32 has at least one driven wheel 74 on the right side and at least one driven wheel 76 on the left side, and axle 33 has at least one driven wheel 80 on the right side and at least one driven wheel 82 on the left side. All wheels comprise pneumatic tires. The truck vehicle which is illustrated is an example of a highway tractor which has a fifth wheel 34 to which a trailer can be coupled for towing by the tractor.

A controller 38 controls which one, or ones, of engines 1 and 5 is, or are, used at any given time when the vehicle is being operated. Controller 38 comprises a control strategy for coordinating control of the engines acting through the torque converters and of the series hybrid drive to manage powerflow to the driven wheels.

When the truck vehicle is being propelled, one or both engines are operated depending on the amount of torque being requested by the driver. The torque request is commonly provided by depression of an accelerator pedal in cab C. A sensor which tracks pedal depression provides an input to controller 38 which has a control strategy that acts on the input to control drive 100 in a manner which leads to satisfaction of the request.

A flywheel is coupled for rotation with the respective engine crankshaft near a respective rear main bearing for the crankshaft. Each flywheel stores rotational energy created by the power impulses of the respective engine that occur during each combustion event in the cylinders of the respective engine, and releases stored energy between power impulses, thus assuring less fluctuation in engine speed and smoother engine operation. The size of the flywheel depends on the number of engine cylinders and the general construction of the engine. With a large number of cylinders and the consequent overlapping of power impulses, there is less need for a flywheel and consequently a flywheel can be relatively smaller.

Each flywheel is coupled through the respective torque converter to an input end of a respective rotor shaft of series hybrid generator 3, as will be more fully explained later.

When driven wheels 74, 76, 80, 82 are driven to propel the vehicle, they become loads on rotary electric machine 29. Electric machine 29 and those driven wheels then become the load on series hybrid generator 3. When propelling the vehicle, electric machine 29 operates as an electric propulsion, or drive, motor.

The mechanical energy input applied to a rotor shaft of series hybrid generator 3 causes series hybrid generator 3 to deliver electric current to electric machine 29, causing the latter to operate as an electric motor that provides torque to the driven wheels 74, 76, 80, 82 of the tandem axle for satisfying a torque request by the driver.

Controller 38 can also coordinate control of electric machine 29 with that of series hybrid generator 3 and of engines 1, 5. By controlling electric machine 29 to regulate the load on series hybrid generator 3, engine speed and that of the rotor shaft(s) of series hybrid generator 3 can be held constant while accelerating the truck, thereby providing acceleration in the same manner as an infinitely variable mechanical transmission.

By making the electric machine 29 reversible, the truck vehicle can be driven either forward or in reverse.

The truck vehicle can also provide brake energy recovery by using the driven axle wheels to operate electric machine 29 as an electric generator to charge an energy storage device or system, such as a battery, battery bank, or ultra-capacitor 39.

Figure 9:
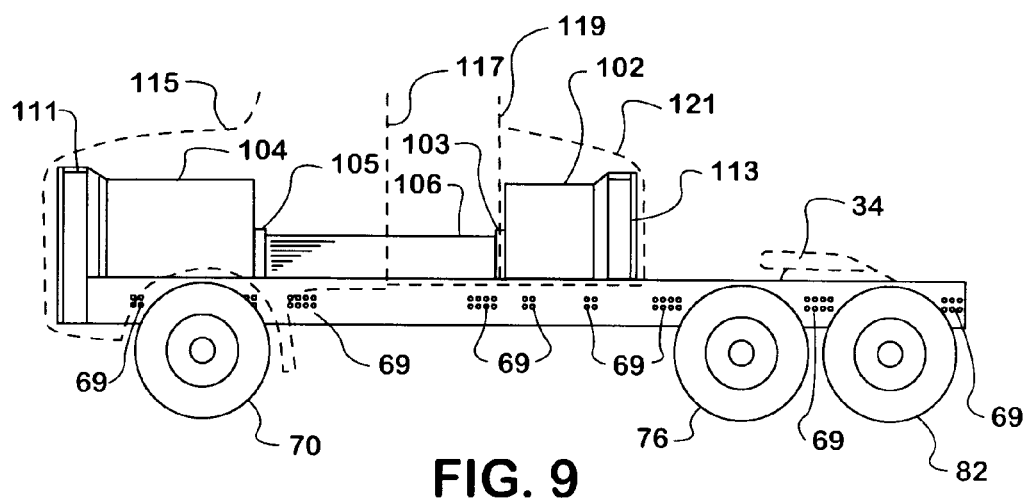
FIG. 9 is a left side elevation view of another truck chassis that embodies a dual-engine, variable-power drive.
Figure 10:
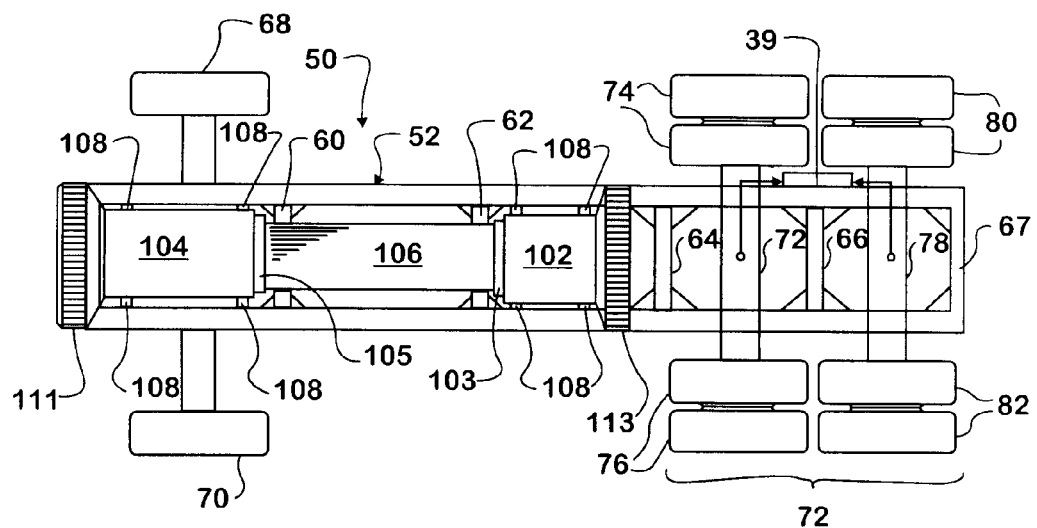
FIG. 10 is a top view of the truck chassis of FIG. 9.

FIGS. 9 and 10 illustrate a truck vehicle chassis 50 having a length extending from front to rear, a right side, and a left side. Chassis 50 comprises a frame 52 having a right side rail 54 extending from front to rear, a left side rail 56 extending from front to rear, and various cross-members 58, 60, 62, 64, 66, 67 bridging the side rails. The cross-members are securely fastened to the side rails by Huck fasteners 69.

Right and left front steerable wheels 68, 70 respectively are suspended from frame 52 on the right and left sides for steering the truck vehicle. A tandem rear axle 72 is suspended from frame 52 rearward of front steerable wheels 68, 70. Tandem rear axle 72 is illustrated by way of example to comprise two electric drive axles, one of which is a first (front tandem) drive axle 72 having at least one driven wheel 74 on the right side and at least one driven wheel 76 on the left side and the other of which is a second (rear tandem) drive axle 78 rearward of first drive axle 72 and having at least one driven wheel 80 on the right side and at least one driven wheel 82 on the left side. All wheels comprise pneumatic tires.

Each drive axle 72, 74 comprises a respective differential gear mechanism which is operated by a respective rotary electric machine housed within a respective casing within which respective right and left axle shafts extend from the respective differential gear mechanism to the respective axle's right and left driven wheels.

A dual-engine, variable-power drive 100 drives the rotary electric machine of each electric drive axle to deliver torque to wheels 74, 76, 80, 82 to propel the vehicle. Dual-engine, variable-power drive 100 comprises a rear internal combustion engine 102 and a front internal combustion engine 104 at opposite lengthwise ends. Drive 100 also comprises a rear torque converter 103, a front torque converter 105, and a series hybrid generator 106. A respective flywheel is coupled for rotation with the respective engine crankshaft as explained in the description of earlier Figures.

In FIG. 9 the front of front engine 104 and the front of rear engine 102 face in opposite directions at the far ends of drive 100. A cooling module 111 for engine 104 is mounted on chassis frame 52 frontally of engine 104, and a cooling module 113 for engine 102 is mounted on chassis frame 52 rearward of engine 102.

The top half of each of four engine mounts 108 is fastened to the block of each engine at the four locations shown, and the bottom half of each engine mount is permanently secured to one of the frame side rails using Huck fasteners. The four-point mounting of each engine to the chassis frame contributes to rigidity of the chassis frame.

When one engine, such as front engine 104 for example, can provide sufficient power and torque for propelling a truck (approximately 80% of a typical long haul drive cycle), only front engine 104, and not rear engine 102, operates. During portions of a drive cycle where demand is greater, a controller like controller 38 automatically starts rear engine 102 to provide the additional power required. Once the drive cycle returns to lesser demand, the controller automatically turns off rear engine 102.

Controller 38 provides control of either engine 102, 104 when only one engine is used, and of both engines 102, 104 when both are used, to provide output torque corresponding to a torque request from the driver.

The engine output torque operates series hybrid generator 106, causing series hybrid generator 106 to deliver electric current to the electric drive axle motors so that they provide torque to the driven wheels correlated with the torque request. The driven wheels at the ends of the electric drive axles are loads on the electric drive axle motors. The electric drive axle motors and the driven wheels at the ends of the axles are loads on series hybrid generator 106.

The controller also coordinates control of series hybrid generator 106 and of the motors of the electric drive axles with control of engines 102, 104. By controlling the electric axle drive motors to regulate the load on series hybrid generator 106, engine speed and that of the series hybrid generator's rotor shaft(s) can be held constant while accelerating the truck, thereby providing acceleration in the same manner as an infinitely variable mechanical transmission.

By making the electric axle drive motors reversible, a truck can be driven either forward or in reverse.

The truck can also provide brake energy recovery by using the driven axle wheels to operate the electric motors of the drive axles as electric generators to charge a battery, a battery bank, or an ultra-capacitor.

Shown in phantom in FIG. 9 are a front hood 115 covering engine 104 and having a grill frontally of cooling module 111. The rear of a day cab is marked at 117 and that of a sleeper cab at 119. A rear hood 121 covers engine 102 and has a grill rearward of cooling module 113. The rear hood will extend to the rear of either type of cab.

Preferably each engine 102, 104 is a standard production engine with approximately 131 hp, more or less, with CCW flywheel rotation. An example of such an engine is a Maxx-Force 8 engine weighing approximately 1200 lbs, about half that of a 460 hp MaxxForce 13 engine.

The disclosed drive 100 can be used as the power unit of a propulsion system in numerous mobile vocations which include, on-road (commercial vehicles, for example), off-road (construction shovels, creepers, for example), agricultural (combines, for example), light and heavy rail (passenger and freight locomotives, for example), load trains such as those used to haul freight across remote areas of some countries such as Australia, marine (naval vessels and icebreakers, for example), and military vehicles. It can also stand alone as an electric generator station, such as a back-up electric generator that is used during electric utility power outages.

FIG. 3 is representative of the torque/power capability of each individual engine 1, 5, 102, 104. Each engine has approximately one-half the peak power capability of a single engine having the torque/power capability shown in FIG. 4. Drive 100 can provide ample torque and power most of a typical drive cycle by operating only one engine, using both engines only when extra power is needed. This will accomplish significant fuel economy improvement.

Figure 11:
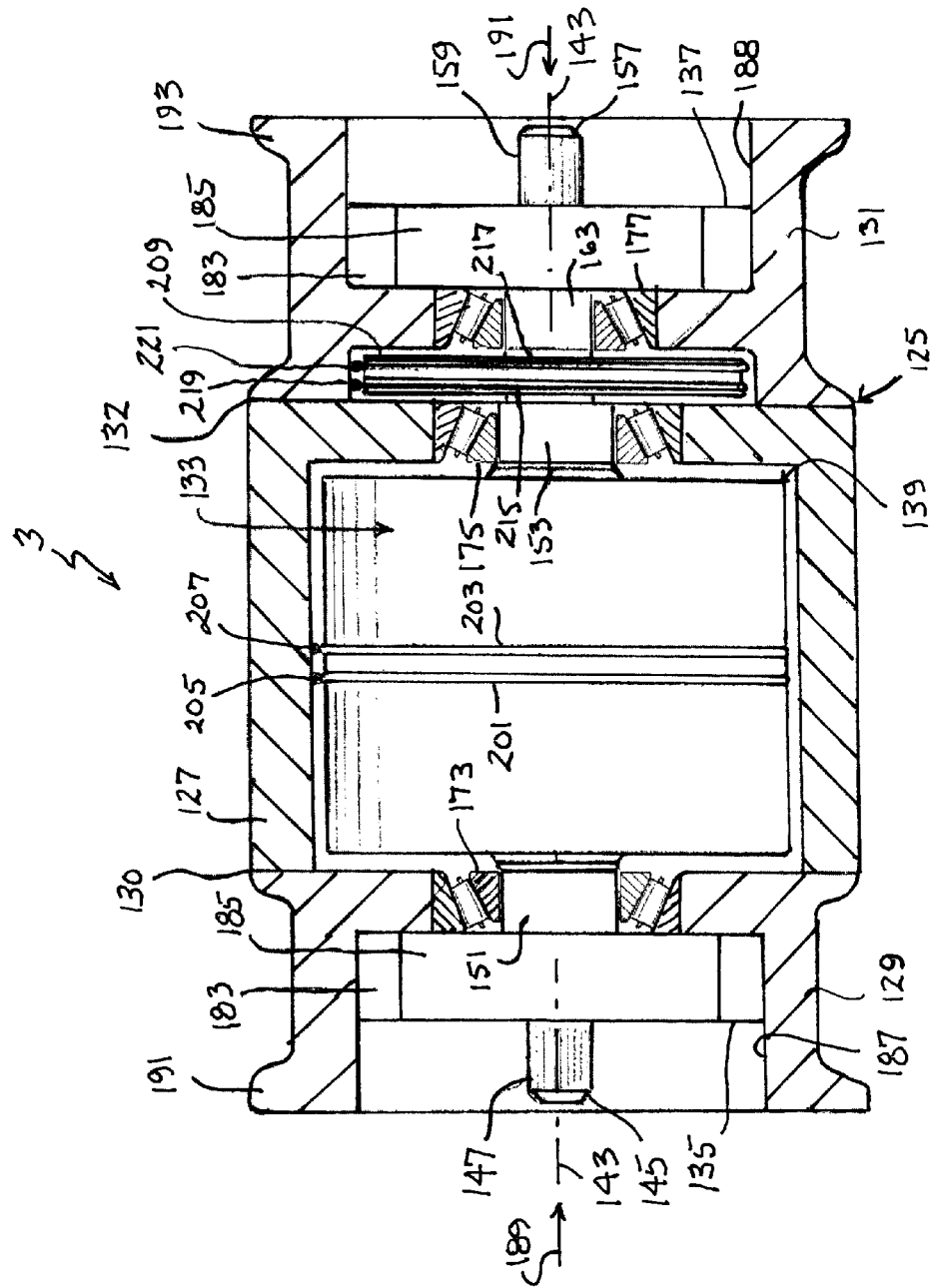
FIG. 11 is a longitudinal cross section view of a series hybrid generator which can be used in a dual-engine, variable-power drive.
Figure 12:
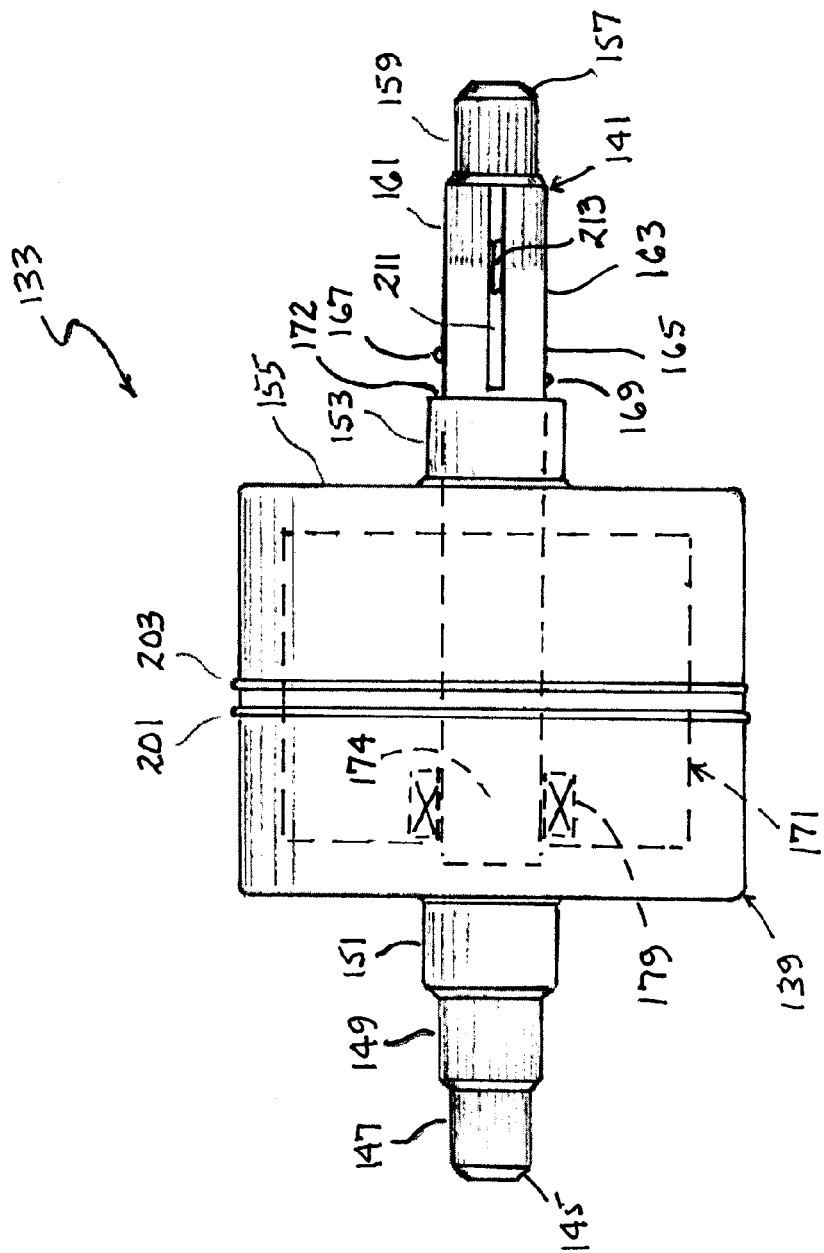
FIG. 12 is a longitudinal view of an electric generator assembly of the series hybrid generator.

FIGS. 11 and 12 show structural detail of a series hybrid generator 123 like the ones described above.

Series hybrid generator 3 comprises a housing 125 which comprises a generator casting 127, an outer rotor engine mount casting 129, and an inner rotor engine mount casting 131. To save weight, these castings may be compressed graphite.

Generator casting 127 has opposite longitudinal ends, to a first of which outer rotor engine mount casting 129 is assembled and to a second of which inner rotor engine mount casting 131 is assembled. A first gasket 130 seals the housing interior between outer rotor engine mount casting 129 and generator casting 127, and a second gasket 132 seals the housing interior between inner rotor engine mount casting 131 and generator casting 127.

Housing 125 houses an electric generator assembly 133, a first one-way clutch assembly 135, and a second one-way clutch assembly 137.

Electric generator assembly 133 comprises an outer rotor assembly 139 and an inner rotor assembly 141 both of which are supported on housing 125 for rotation about an axis 143.

Outer rotor assembly 139 has an outer rotor shaft 145 which comprises, in succession starting at an input end: an outer rotor torque converter spline 147, an outer rotor one-way clutch spline 149, and a first bearing mount 151. Outer rotor shaft 145 ends in a second bearing mount 153. Between first and second bearing mounts 151, 153, outer rotor shaft 145 supports an outer rotor electric generator 155.

Inner rotor assembly 141 has an inner rotor shaft 157 which comprises, in succession starting at an input end: an inner rotor torque converter spline 159, an inner rotor one-way clutch spline 161, a first bearing mount 163, and a slip ring wheel mount 165 on which are disposed first and second electric terminals 167, 169.

Second bearing mount 153 of outer rotor assembly 139 has a through-hole which is concentric with axis 143 and which provides clearance for inner rotor shaft 157 to pass through to an inner rotor electric generator 171 which is within an interior space surrounded circumferentially by outer rotor electric generator 155. A seal 172 seals the outer diameter of inner rotor shaft 157 to the through-hole in second bearing mount 153. Inner rotor shaft 157 ends beyond inner rotor electric generator 171 in a second bearing mount 174. While the drawing shows the inner rotor generator disposed completely within a space which is circumferentially surrounded by the outer rotor generator so that the latter completely axially overlaps the former, the inner rotor generator may be only partially circumferentially surrounded by the outer rotor generator so that they only partially axially overlap.

Taper bearing assemblies 173, 175 are mounted on outer rotor engine mount casting 129 and generator casting 127 respectively to support outer rotor assembly 139 at bearing mounts 151, 153 for low-friction rotation about axis 143.

Inner rotor assembly 141 is supported by taper bearing assemblies 177, 179 at bearing mounts 163, 174 for low-friction rotation about axis 143.

The construction of outer rotor electric generator 155 comprises a frame on which taper bearing assembly 179 is mounted. Taper bearing assembly 177 is mounted on inner rotor engine mount casting 131.

Consequently, inner rotor shaft 157 is supported for rotation about axis 143 at opposite ends of inner rotor electric generator 171, and outer rotor shaft 145 is supported for rotation about axis 143 at opposite ends of outer rotor electric generator 155.

One-way clutch assembly 135 comprises a circular mounting ring 183 and a circular clutch rotor 185. Mounting ring 183 fits within a circular recess 187 of outer rotor engine mount casting 129 and is fastened to outer rotor engine mount casting 129. Clutch rotor 185 is disposed within mounting ring 183 and comprises an internal spline which meshes with outer rotor one-way clutch spline 149 to rotationally couple outer rotor shaft 145 and clutch rotor 185.

One-way clutch assembly 135 comprises a mechanism which acts between mounting ring 183 and clutch rotor 185 to allow the clutch rotor to free wheel in a clockwise direction of rotation as viewed in the direction of arrow 189 while disallowing counter-clockwise rotation.

One-way clutch assembly 137 fits within a circular recess 188 of inner rotor engine mount casting 131 and has a construction like that of one-way clutch assembly 135, allowing free-wheeling clockwise clutch rotor rotation as viewed in the direction of arrow 191 but disallowing counter-clockwise rotation.

From the foregoing description, it can be understood that clockwise rotation of outer rotor shaft 145 imparts clockwise rotation to outer rotor electric generator 155, with the rotating mass being supported on housing 125 via taper bearings 173, 175 and that clockwise rotation of inner rotor shaft 157 imparts clockwise rotation to inner rotor electric generator 171, with the rotating mass being supported on housing 125 via taper bearing 177 and on the frame of outer rotor electric generator 155. The clockwise rotation of each rotor assembly 139, 141 is however counter-clockwise to the clockwise rotation of the other rotor assembly.

The frame of outer rotor electric generator 155 on which taper bearing assembly 179 is mounted also mounts an outer rotor electric generator winding having terminations connected to respective outer rotor slip rings 201, 203 which are axially spaced apart and extend circumferentially around the outside of outer rotor electric generator 155. Outer rotor electric brushes 205, 207 on the interior of generator casting 127 are biased into contact with respective slip rings 201, 203 providing connection of the outer rotor electric generator winding to electric terminals on the housing exterior which are parts of an electric interface which provides for selectively connecting the outer rotor winding to one of an electric current source and an electric load.

An inner rotor slip ring wheel 209 is disposed on inner rotator shaft 157, and keyed to that shaft via a slot 211 in the shaft and a key 213 which fits to both slot 211 and a slot in the wheel.

Inner rotor slip rings 215, 217 are axially spaced apart and extend circumferentially around the outside of inner rotor slip ring wheel 209. Inner rotor electric brushes 219, 221 on the interior of inner rotor engine mount casting 131 are biased into contact with respective slip rings 215, 217.

Inner rotor electric generator 171 comprises a frame on which an inner rotor electric generator winding is mounted. That winding has terminations at electric terminals 167, 169 on inner rotor shaft 157 which connect with respective inner rotor slip rings 215, 217, enabling the winding to connect through the slip rings and brushes 219, 221 with electric terminals on the housing exterior which are other parts of the electric interface which provides for selectively connecting the inner rotor winding to one of the electric current source and the electric load. When the outer rotor winding is connected to the electric current source, the inner rotor winding is connected to the electric load, and vice versa.

An outer longitudinal end of outer rotor engine mount casting 129 opposite generator casting 127 comprises a mounting flange 191 having a bolt hole pattern for fastening housing 125 to a matching end of a housing of torque converter 2 of engine 1.

An outer longitudinal end of inner rotor engine mount casting 131 opposite generator casting 127 comprises a mounting flange 193 having a bolt hole pattern for fastening housing 125 to a matching end of a housing of torque converter 2 of engine 5.

A series hybrid generator can be constructed to bolt onto conventional counter-clockwise rotation, mass-produced, diesel engines, eliminating the need for special engines built specifically for use with the series hybrid generator. The one-way clutches prevent one engine from rotating the other through magnetic interactions within the series hybrid generator.

The ability of the series hybrid generator to generate electric current occurs because of interactions between respective magnetic fields produced by the respective generator windings of the inner rotor electric generator 171 and the outer rotor electric generator 155.

Magnetic field interactions can occur in the following ways.

Engine 1 operating, Engine 2 stopped: Electric current from an external source is supplied through brushes 219, 221 and slip rings 215, 217 to the winding of inner rotor generator 171 to create a magnetic field. As outer rotor generator 155 is rotated by engine 1, the winding of the outer rotor generator delivers electric current through slip rings 201, 203 for use in operating electric machine 29. The interaction would rotate inner rotor generator 171 were it not for one-way clutch 137 preventing the rotation.

Engine 1 stopped, Engine 2 operating: Electric current from an external source is supplied through brushes 205, 207 and slip rings 201, 203 to the winding of outer rotor generator 155 to create a magnetic field. As inner rotor generator 171 is rotated by engine 2, the winding of the inner rotor generator delivers electric current through slip rings 215, 217 for use in operating electric machine 29. The interaction would rotate outer rotor generator 171 were it not for one-way clutch 135 preventing the rotation.

Engine 1 operating, Engine 2 operating: Electric current from an external source is supplied through either brushes 205, 207 and slip rings 201, 203 to the winding of outer rotor generator 155 or through brushes 219, 221 and slip rings 215, 217 to the winding of inner rotor generator 171, but not to both windings. The other winding not supplied with external current generates electric current for use in operating electric machine 29. Because the inner and outer rotor generators are rotating in opposite senses relative to each other lines of magnet flux created by current from an external source are effectively cut more frequently than if one generator were not rotating, thereby causing the other generator to generate larger electric current than when the one generator is not rotating. The electrical energy that is generated, which may for example be AC current, is directly proportional to the summation of the rotational distance of the inner rotor added to that of the outer rotor.

When a first of the rotors is not being rotated by its engine, that rotor is stationary relative to the other (second) rotor which is being rotated by its engine, causing the electrical energy output of the generator from the second rotor to be proportional to the second rotor's speed. The electrical energy output is also a function of the electric current being input to the first rotor. The non-rotating rotor acts as a stator for the rotating rotor.

When the first rotor is also being rotated by its engine, the first rotor becomes a "rotating stator" for the rotating second rotor. This causes the electrical energy output of the generator from the second rotor to be proportional not only to the second rotor's speed but also to the first rotor's speed. The electrical energy output remains a function of the electric current being input to the first rotor. Because the rotors are rotating in opposite directions relative to each other, summation of their rotational distances is the primary quantitative parameter of electrical energy generated. In this way for a constant current input to the first rotor, electrical energy output from the second rotor increases with increasing speed difference between the two rotors.

In this disclosure, the windings are constructed as electromagnets rather than permanent magnets. When the vehicle is stopped in traffic, energy is conserved by having the generator not generate electricity. Accordingly, electromagnets will be activated and deactivated as appropriate during an entire drive cycle to control the total quantity of electrical energy generated during the drive cycle.

What is claimed is:

1. A vehicle comprising:
    a chassis frame from which at least one drive axle is suspended, the drive axle having an electric propulsion motor and driven wheels supporting the chassis on an underlying surface for propelling the vehicle along an underlying surface when the electric propulsion motor operates;
    a first internal combustion engine;
    a second internal combustion engine;
    an electric generator comprising a housing having opposite longitudinal ends and an axis extending between the longitudinal ends;
    an outer rotor supported on the housing for rotation about the axis and having a shaft input end lying on the axis at a first of the longitudinal ends of the housing;
    an inner rotor supported on the housing for rotation about the axis and having a shaft input end lying on the axis at a second of the longitudinal ends of the housing;
    the outer rotor comprising an outer rotor generator having an outer rotor winding;
    the inner rotor comprising an inner rotor generator having an inner rotor winding;
    an electric interface on the housing for interfacing the outer rotor winding and the inner rotor winding to external electric devices;
    an outer rotor circuit electrically connecting the outer rotor winding to the electric interface;
    an inner rotor circuit electrically connecting the outer rotor winding to the electric interface;
    an outer rotor one-way clutch which allows the outer rotor to be rotated by its shaft input end in one of a clockwise direction and a counter-clockwise direction, but not in the other direction, about the axis as viewed looking from the first longitudinal end of the housing toward the second longitudinal end of the housing;
    and an inner rotor one-way clutch which, as viewed from the second longitudinal end of the housing toward the first longitudinal end of the housing, allows the inner rotor to be rotated by its shaft input end in one direction which is opposite the one direction of the outer rotor allowed by the outer rotor one-way clutch, but not in the one direction of the outer rotor allowed by the outer rotor one-way clutch;
    a first torque converter through which the first internal combustion engine is coupled to the shaft input end of the outer rotor; and
    a second torque converter through which the second internal combustion engine is coupled to the shaft input end of the inner rotor; and
    in which the electric interface connects the winding of one of the rotors to an electric current source and the winding of the other rotor to the electric propulsion motor.

2. A vehicle as set forth in claim 1 in which the inner rotor generator is disposed at least partially within a space which is circumferentially surrounded by the outer rotor generator.

3. A vehicle as set forth in claim 2 in which the outer rotor generator comprises a frame on which are disposed the outer rotor winding and a bearing assembly which supports the inner rotor for rotation.

4. A vehicle as set forth in claim 3 further comprising a bearing assembly on the housing which supports the inner rotor for rotation.

5. A vehicle as set forth in claim 1 in which the outer rotor circuit comprises brushes mounted on the housing and slip rings mounted on the outer rotor, and the inner rotor circuit comprises brushes mounted on the housing and slip rings mounted on the inner rotor.

6. A vehicle as set forth in claim 5 in which the brushes and slip rings of the inner rotor circuit are disposed axially beyond both the outer rotor generator and the inner rotor generator.

7. A vehicle as set forth in claim 6 in which the slip rings of the outer rotor circuit are disposed circumferentially around the outer rotor generator.

8. A vehicle as set forth in claim 1 in which the first internal combustion engine operates with counter-clockwise rotation as viewed from the shaft input end of the outer rotor, and the second internal combustion engine operates with counter-clockwise rotation as viewed from the shaft input end of the inner rotor.

* * * * *